United States Patent [19]

Morterol et al.

[11] Patent Number: 4,987,212

[45] Date of Patent: Jan. 22, 1991

[54] COPOLYMERIZATION OF ETHYLENE AND AN ALPHA-OLEFIN HAVING SIX CARBON ATOMS COMPRISING HEXENE-1 OR 4-METHYL-PENTENE-1 IN A FLUIDIZED BED

[75] Inventors: Frederic Morterol, Lavera; Jean-Louis Vidal, Martigues, both of France

[73] Assignee: BP Chimie Societe Anonyme, Lavera, France

[21] Appl. No.: 117,400

[22] Filed: Nov. 3, 1987

Related U.S. Application Data

[60] Continuation of Ser. No. 880,126, Jun. 30, 1986, abandoned, which is a division of Ser. No. 689,017, Jan. 3, 1985, Pat. No. 4,642,328, which is a continuation of Ser. No. 525,545, Aug. 22, 1983, abandoned.

[30] Foreign Application Priority Data

Sep. 7, 1982 [FR] France ................ 82 15162

[51] Int. Cl.$^5$ ......................................... C08F 210/14
[52] U.S. Cl. .................................................. 526/348.4
[58] Field of Search ................................... 526/348.4

[56] References Cited

U.S. PATENT DOCUMENTS

| | | | |
|---|---|---|---|
| 3,953,414 | 4/1976 | Galli | 526/348.6 |
| 4,076,698 | 2/1978 | Anderson et al. | 526/348.6 |
| 4,111,835 | 9/1978 | Foschini | 525/125 |
| 4,205,021 | 5/1980 | Morita | 526/348.4 |
| 4,302,565 | 11/1981 | Goeke | 526/125 |
| 4,396,748 | 8/1983 | Shipley | 526/125 |
| 4,405,774 | 9/1983 | Miwa | 526/348.4 |
| 4,482,687 | 11/1984 | Noshay et al. | 526/125 |
| 4,522,987 | 6/1985 | Hogan et al. | 526/348.4 |
| 4,525,257 | 6/1985 | Kurtz | 526/348.4 |

FOREIGN PATENT DOCUMENTS 2029840 3/1980 United Kingdom .

OTHER PUBLICATIONS

Karol et al., Catalysis and the UNIPOL Process for Ethylene Polymerization, 190th ACS National Meeting, pp. 22-30, 9/1985.

Lassalle et al., Kinetics Studies of Ethylene Polymerisation in the Gas Phase with High Yield Ziegler Catalysts, 27th Int. Symposium on Macromolecules, vol. 1, pp. 230-234, 7/1981.

Finogenova et al., Polymer Science USSR, vol. 22, pp. 448-454, 1980.

duPont v. Phillips Petroleum 2USPQ2d 1545 (D. Del. 1987).

duPont v. Phillips Petroleum 7USPQ2d 1129 (Fed. Cir. 1988).

s.

*Primary Examiner*—Paul R. Michl
*Assistant Examiner*—Lee C. Wright
*Attorney, Agent, or Firm*—Brooks Haidt Haffner & Delahunty

[57] ABSTRACT

Process for the preparation of copolymers of ethylene and an alpha-olefin having six carbon atoms comprising hexene-1 or 4-methyl-pentene-1 with a density comprised between 0.910 and 0.940, involving a copolymerization of ethylene and an alpha-olefin having six carbon atoms comprising hexene-1 or 4-methyl-pentene-1 in the gas phase by means of a fluidized bed, in the presence of a catalyst system comprising on the one hand a co-catalyst consisting of at least one organo-metallic compound of a metal of Groups, II and III of the Periodic Table of Elements and on the other hand a supported catalyst comprising a special support based essentially on magnesium chloride and optionally aluminum chloride, on which support there has been precipitated a derivative of a transition metal of Groups IV, V and VI of the Periodic Table of Elements.

5 Claims, No Drawings

COPOLYMERIZATION OF ETHYLENE AND AN ALPHA-OLEFIN HAVING SIX CARBON ATOMS COMPRISING HEXENE-1 OR 4-METHYL-PENTENE-1 IN A FLUIDIZED BED

This application, Ser. No. 07/117,400, filed Nov. 3, 1987, is a continuation of application Ser. No. 06/880,126, filed June 30, 1986 as a division of application Ser. No. 06/689,017, filed Jan. 3, 1985, now U.S. Pat. No. 4,642,328, which in turn is a continuation of application Ser. No. 06/525,545, filed Aug. 22, 1983, now abandoned.

The present invention relates to a process for the production of copolymers of ethylene and an alpha-olefin having six carbon atoms comprising hexene-1 or 4-methyl-pentene-1 with a density comprised between 0.910 and 0.940, obtained by copolymerisation in the gas phase by means of a fluidised bed.

It is already known that one can produce in solution in a liquid hydrocarbon medium copolymers of ethylene and an alpha-olefin comprising more than 5 carbon atoms. Processes of this type require the use of solvents and involve delicate operations to recover the copolymer from the solution. Moreover, a not inconsiderable part of the copolymer remains dissolved in the solvent, which renders the operations of recovery and purification of the said solvent difficult.

It is also known that one can produce in the gas phase copolymers of ethylene and higher alpha-olefins comprising more than 5 carbon atoms, these copolymers having a density comprised between 0.900 and 0.940, the copolymerisation being effected in the presence of a catalyst system comprising a solid catalyst obtained by pulverising a magnesium compound, such as magnesium chloride, and a compound of a transition metal. In view of its broad particle size distribution, a catalyst of this type cannot be utilised for polymerisation carried out in reactors with a fluidised bed in which the speed of fluidisation is high, for example comprised between 5 and 10 times the minimum speed of fluidisation, without causing a considerable carry-over of particles from the fluidised bed.

A process has also been proposed for copolymerising in the gas phase ethylene and higher alpha-olefins comprising up to 6 carbon atoms, by means of a fluidised bed and in the presence of a catalyst system comprising as catalyst a solid compound of magnesium, titanium and halogen, obtained by reacting tetravalent titanium compounds with an organo-magnesium compound (or magnesium metal) and an alkyl halide. According to this process the copolymer during its formation in the fluidised bed occurs (especially when the higher alpha-olefin employed comprises more than 4 carbon atoms), in the form of a powder composed of sticky particles, favouring the formation of agglomerates which are prejudicial to the proper operation of the fluidised bed.

A process has now been found which makes it possible to avoid these drawbacks and obtain without difficulty by copolymerisation in the gas phase by means of a fluidised bed copolymers of ethylene and an alpha-olefin having six carbon atoms comprising hexene-1 or 4-methyl-pentene-1 having a density comprised between 0.910 and 0.940.

The object of the present invention is therefore a process for obtaining such copolymers by the copolymerisation of ethylene and an alpha-olefin having six carbon atoms comprising hexene-1 or 4-methyl-pentene-1 in the gas phase by means of a fluidised bed in contact with a catalyst system consisting of:

(i) a co-catalyst consisting of a organo-metallic compound of a metal of Groups II and III of the Periodic Table of Elements, (ii) a supported catalyst, the support being basically a magnesium chloride having specific properties and the catalyst comprising a derivative of a metal belonging to Groups IV, V and VI of the Periodic Table of Elements, especially a titanium compound known for its catalytic properties in the polymerisation of ethylene and alpha-olefins.

According to the invention, the catalyst support consists of particles based essentially on magnesium chloride, which have the following characteristics:

the particles have a spheroidal form defined by the fact that if D and d are the large and small axes of these particles, D/d is not greater than 1.3;

the particles have a mean diameter by mass adjustable at will and comprised between approximately 10 and 100 microns;

the particle size distribution of these particles is such that the ratio $D_m:D_n$ of the mean diameter by mass, $D_m$, to the mean diameter by number, $D_n$, is not greater than 3, for example comprised between 1.1 and 2.5; more especially the particle size distribution of these particles is very narrow and is such that the ratio $D_m:D_n$ is comprised between 1 and 1.5; in addition, the practically total absence of particles of a diameter greater than $2 \times D_m$ or less than $0.2 \times D_m$ may be noted; the particle size distribution may also be such that more than 90 per cent by weight of the particles of one and the same batch are comprised in the bracket $D_m \pm 10\%$;

the particles may have a slightly dented surface such as that of a raspberry, but preferably have a very smooth surface;

the specific surface area of the particles is comprised between about 20 and 60 m$^2$/g (BET);

the density of the particles is comprised between about 1.6 and 2.2;

the particles consist essentially of magnesium chloride and optionally aluminium chloride; the particles preferably contain a small proportion of products with an Mg-C bond and consequently the atomic ratio $Cl/(Mg+3/2Al)$ is preferably slightly less than 2;

the particles preferably contain a small proportion of an electron donor compound.

The supports thus defined may in particular be prepared by reacting an organo-magnesium compound with a chlorinated organic compound in the presence of an electron donor compound. As organo-magnesium compound one may choose either a product of the formula $R_1MgR_2$, or an addition complex of the formula $R_1MgR_2 \cdot xAl(R_3)_3$, in which formulae $R_1$, $R_2$ and $R_3$ are identical or different alkyl radicals having from 2 to 12 carbon atoms and x is comprised between 0.001 and 10, preferably comprised between 0.01 and 2. As chlorinated organic compound one selects an alkyl chloride of the formula $R_4Cl$ in which $R_4$ is a secondary or preferably tertiary alkyl radical having from 3 to 12 carbon atoms. The electron donor compound utilised is an organic compound comprising at least one atom of oxygen, sulphur, nitrogen and/or phosphorus. It may be chosen from among a wide variety of products such as the amines, amides, phosphines, sulphoxides, sulphones and ethers. Among the electron donor compounds one may select in particular an aliphatic ether oxide of the formula $R_5OR_6$, in which $R_5$ and $R_6$ are identical or different alkyl radicals having from 1 to 12 carbon atoms.

Moreover, the various reactants utilised for the preparation of the support such as defined above must be employed under the following conditions:

- the molar ratio $R_4Cl/R_1MgR_2$ is comprised between 1.5 and 2.5 and preferably is comprised between 1.85 and 1.95;
- the molar ratio $R_4Cl/R_1MgR_2.xAl(R_3)_3$ is comprised between 1.5 (1+3/2.x) and 2.5 (1+3/2.x), and preferably between 1.85 (1+3/2.x) and 1.95 (1+3/2.x);
- the molar ratio between the electron donor compound and the organo-magnesium compound ($R_1MgR_2$ or $R_1MgR_2.xAl(R_3)_3$ is comprised between 0.01 and 2, and preferably is comprised between 0.01 and 1;
- the reaction between the organo-magnesium compound and the chlorinated organic compound takes place with agitation in a liquid hydrocarbon at a temperature comprised between 5° C. and 80° C. and especially between 35° C. and 80° C.

The preparation of the catalysts from the supports thus defined is carried out by precipitation on to the said supports of a derivative of a transition metal of Groups IV, V and VI of the Periodic Table of Elements known for its catalytic properties in the polymerisation and the co-polymerisation of ethylene and alpha-olefins, especially of a compound of titanium whose valency is less than 4. This precipitation may be performed according to known processes, but is advantageously effected according to the following process:

The reaction of reducing a titanium compound at its maximum valency, of the formula $Ti(OR_7)_{4-n}X_n$, in which $R_7$ is an alkyl group containing 2 to 6 carbon atoms, X is a chlorine or bromine atom and n is an integer or fraction from 1 to 4 inclusive, is carried out by means of a reducing agent chosen from among the organo-magnesium compounds of the formula $R_8MgR_9$, in which $R_8$ and $R_9$ are identical or different alkyl groups containing 2 to 12 carbon atoms, organo-zinc compounds of the formula $Zn(R_{10})_{(2-y)}X_y$, in which $R_{10}$ is an alkyl group having 2 to 12 carbon atoms, X is chlorine or bromine and y is zero, one, or a fraction between 0 and 1, and organo-aluminium compounds of the formula $Al(R_{11})_{(3-x)}X_x$, in which $R_{11}$ is an alkyl group having 2 to 12 carbon atoms, X is chlorine or bromine and x is zero or an integer or fraction not greater than 2;

the said reduction reaction is performed in the presence or absence of an electron donor compound chosen from among a wide variety of organic compounds comprising at least one atom of oxygen, sulphur, nitrogen and/or phosphorus, such as for example amines, amides, phosphines, sulphoxides, sulphones or ethers; as electron donor compound, one may choose in particular an aliphatic ether oxide of the formula $R_{12}OR_{13}$, in which $R_{12}$ and $R_{13}$ are identical or different alkyl groups having 1 to 12 carbon atoms;

the relative molar quantities of the various compounds (support, titanium compound, organo-magnesium and/or organo-zinc and/or organo-aluminium compound, electron donor or ether oxide) are, in molar ratios, such that:

Support:compound of titanium comprised between 1 and 50, and preferably comprised between 2.5 and 10;

Organo-magnesium and/or organo-zinc and/or organo-aluminium compound:titanium compound comprised between 0.1 and 3, preferably comprised between 0.5 and 1.5;

Electron donor compound or ether oxide:titanium compound comprised between 0 and 5, and preferably comprised between 0.1 and 1.5.

The precipitation is effected at a temperature comprised between −30° C. and 100° C. with agitation, in a liquid hydrocarbon medium.

The use of the reagents in this precipitation may be carried out in various ways. One may, for example, introduce the reducing agent gradually (organo-magnesium or organo-zinc or organo-aluminium compound) into a liquid hydrocarbon medium containing the magnesium chloride support and the titanium compound. It is also possible to introduce gradually and simultaneously the reducing agent and the titanium compound into the liquid hydrocarbon medium containing the magnesium chloride support. However, it is generally preferable to introduce the titanium compound gradually into the liquid hydrocarbon medium containing the magnesium chloride support and the reducing agent.

The catalysts obtained according to the present invention occur in the form of a powder, generally of a brownish-red colour, consisting of particles whose physical properties such as the spheroidal shape, surface appearance, mean diameter by mass and particle size distribution defined by the ratio Dm/Dn, are more or less identical to those of the particles of magnesium chloride support form which they originated.

After the evaporation of the liquid hydrocarbon medium in which they were prepared, the catalysts according to the present invention are used for the copolymerisation of ethylene and an alpha-olefin having six carbon atoms comprising hexene-1 or 4-methyl-pentene-1, using known techniques of polymerisation in the gas phase by means of a fluidised bed.

The copolymerisation is performed by using as co-catalyst an organo-metallic compound of a metal of Groups II and III of the Periodic Table, preferably an organo-aluminium or organo-aluminium halide compound. The components of the catalyst system must be used in proportions such that the atomic ratio of the quantity of metal of Groups II and III of the co-catalyst to the quantity of transition metal of Groups IV, V and VI of the catalyst is comprised between 0.5 and 200, preferably comprised between 1 and 50.

The catalytic systems used may be employed as such or after undergoing a pre-polymerisation operation. This pre-polymerisation operation leads to the production of particles whose dimensions and shapes are more or less homothetic to those of the initial catalyst, i.e. the shapes of the prepolymer particles are, in effect, "magnified" derivatives of the original particles. The pre-polymerisation consists in bringing the catalyst and co-catalyst in contact with ethylene optionally in admixture with an alpha-olefin having six carbon atoms comprising hexene-1 or 4-methyl-pentene-1; the pre-polymerisation may advantageously be performed in two stages as described below. The catalytic products thus obtained are particularly suited to the co-polymerisation of ethylene and an alpha-olefin having six carbon atoms comprising hexene-1 or 4-methyl-pentene-1 in a fluidised bed: these products possess the dimensions, resistance to abrasion and reactivity which can be adapted to this mode of polymerisation, making it possible to obtain a non-sticky powder, which in particular is free from co-polymers with a low melting point having both a low molecular weight and a relatively high content of an alpha-olefin having six carbon atoms comprising hexene-1 or 4-methyl-pentene-1.

The commencement of the pre-polymerisation reaction (or the first stage of this reaction when one operates in two distinct stages) is suitably performed in suspension in an inert liquid medium.

This first pre-polymerisation stage is continued until each particle of catalyst comprises 0.1 to 10 g of polyethylene or ethylene copolymer per milligramme atom of transition metal present in the catalyst. The prepolymerisation may then be continued either in suspension in a liquid hydrocarbon medium or in the dry state; generally speaking it may be continued—whilst retaining a suitable activity in the catalyst—until 10 to 500 g of polyethylene or ethylene copolymer are obtained per milligramme atom of transition metal present in the catalyst.

The prepolymer obtained according to this process occurs in the form of a powder consisting of particles having a mean diameter by mass generally comprised between 80 and 300 microns, preferably comprised between 100 and 240 microns, and a particle size distribution such that the ratio Dm/Dn is less than or equal to 3, preferably comprised between 1.1 and 2.5; the prepolymer powder contains practically no particles with a diameter greater than 2×Dm or less than 0.2×Dm.

The copolymerisation in the gas phase by means of a fluidised bed may be performed according to conventional techniques of fluidised bed polymerisation and copolymerisation. However, the gaseous mixture providing the fluidisation comprises, in addition to the monomeric ethylene and an alpha-olefin having six carbon atoms comprising hexene-1 or 4-methyl-pentene-1 to be polymerised, an inert gas such as nitrogen, methane or ethane and optionally hydrogen to regulate the molecular weights of the copolymers obtained. The presence of an inert gas in this gaseous mixture appreciably improves the elimination of the heat of reaction and favourably modifies the kinetics of copolymerisation. The speed of fluidisation in the fluidised bed reactor is preferably high enough to facilitate homogenisation of the fluidised bed and to eliminate effectively the heat given off by the copolymerisation, without having recourse to any other means of homogenisation, especially mechanical. The speed of fluidisation is preferably equal to 5 to 10 times the minimum speed of fluidisation, that is to say generally comprised between about 40 and 80 cm/sec. In traversing the fluidised bed only a part of the ethylene and an alpha-olefin having six carbon atoms comprising hexene-1 or 4-methyl-pentene-1 polymerises in contact with the particles of the copolymers in course of growth. The gaseous mixture containing the fraction of ethylene and an alpha-olefin having six carbon atoms comprising hexene-1 or 4-methyl-pentene-1 which has not reacted leaves the fluidised bed and passes through a cooling system intended to eliminate the heat produced during the reaction, before being recycled into the fluidised bed reactor by means of a compressor.

The copolymerisation is suitably performed at a temperature comprised between about 50° C. and 90° C., preferably between 70° C. and 90° C., under a total pressure which may vary in the range generally comprised between 0.5 MPa and 4 MPa.

The partial pressure (pp) of the various constituents of the fluidised gas stream suitably comply with the following ratios: pp an alpha-olefin having six carbon atoms comprising hexene-1 or 4-methyl-pentene-1 is in the range 0.05 MPa to 0.15 MPa: an alpha-olefin having six carbon atoms comprising hexene-1 or 4-methyl-pentene-1/pp ethylene is in the range 0.15 to 0.5: pp hydrogen/pp ethylene is in the range 0.05 to 0.5: pp inert gas/total pressure is in the range 0.2 to 0.9.

The alpha-olefin having six carbon atoms comprising hexene-1 or 4-methyl-pentene-1 employed is preferably an alpha-olefin having six carbon atoms comprising hexene-1 or 4-methyl-pentene-1 having a relatively low boiling point, for example 4-methyl-pentene-1.

When operating according to the process as described above using in particular 4-methyl-pentene-1 as an alpha-olefin having six carbon atoms comprising hexene-1 or 4-methyl-pentene-1, one obtains copolymers containing approximately 4 to 15 percent by weight of units derived from 4-methyl-pentene-1 and having densities comprised between 0.910 and 0.940.

These copolymers occur directly after the copolymerisation in the fluidised bed in the form of powders consisting of non-sticky particles, having a negligible proportion of copolymers with a low melting point having both a low molecular weight and a relatively high content of an alpha-olefin having six carbon atoms comprising hexene-1 or 4-methyl-pentene-1.

These copolymer powders, which are easy to handle, have a comparatively high bulk density, comprised between 0.30 and 0.45 g/cm$^3$, preferably comprised between 0.35 and 0.45 g/cm$^3$.

The copolymer particles making up these powders have a spheroidal shape, defined by the fact that if D and d are the large and small axis of these particles respectively, D/d is less than or equal to 1.3. These particles have mean diameter by mass, Dm, comprised between 300 and 1500 microns, preferably comprised between 500 and 1200 microns. The particle size distribution of these particles is such that the ratio Dm/Dn is less than or equal to 3.5, preferably comprised between 1.2 and 3. The width of particle size distribution of this powder which constitutes the fluidised bed depends not only on that of the prepolymer used, but also on the mean residence time of the copolymer in the fluidised bed reactor, and also on the rate at which the catalytic system loses its activity during the copolymerisation reaction. In particular it is advantageous in such a process to employ a catalyst system which loses its activity relatively rapidly during the copolymerisation reaction, in order to obtain a powder having the narrowest possible particle size distribution.

These copolymers of ethylene and 4-methyl-pentene-1 are also characterised by a very low degree of unsaturation, of less than 0.2 double bond per 1000 carbon atoms, which imparts to them an excellent stability.

By scanning differential calorimetric analysis, after re-heating to 200° C., cooling at a speed of 16° C. per minute, and heating at the rate of 16° C. per minute, these copolymers show a single melting point at a temperature comprised between 116° and 128° C., the fusion pattern characteristically showing a single peak at this temperature, which corresponds to a single distribution of the crystallite dimensions.

The structure of the copolymers is also characterised by a very small amount of long-chain branches (g*), which is expressed by a value $g^* = (\eta)/(\eta_1)$ greater than or equal to 0.90, $(\eta)$ being the intrinsic viscosity of a given copolymer and $(\eta_1)$ being the intrinsic viscosity of a linear polyethylene having the same weight average molecular weight as the said copolymer.

These copolymers whose melt index under 2.16 kg and at 190° C., according to Standard ASTM D 1238, may vary between 0.1 and 30 g per 10 minutes, have some particularly interesting applications in the production of films with a high mechanical strength.

Method for Determining the Mean Diameters by Mass (Dm) and by Number(Dn) of Particles. (Support, Catalyst, Prepolymer, Polymer)

According to the invention, the mean diameters by mass (Dm) and by number (Dn) of the particles of support, catalyst, prepolymer or polymer are measured from microscope readings by means of the OPTOMAX image analyser (Micro-Measurements Ltd., Great Britain). The measuring principle consists in obtaining from the experimental study by optical microscopy of a population of particles a table of absolute frequencies which gives the number $(n_i)$ of particles belonging to each category (i) of diameters, each category (i) being characterised by an intermediate diameter $(d_i)$, comprised between the limits of the said category. According to the approved French standard NF X 11-630 of June 1981, Dm and Dn are provided by the following equations:

- mean diameter by mass: $D_m = \dfrac{\Sigma ni\,(di)^3 di}{\Sigma ni\,(di)^3}$

- mean diameter by number: $D_n = \dfrac{\Sigma ni \cdot di}{\Sigma ni}$

The ratio Dm/Dn characterises the particle size distribution; it is sometimes referred to as "width of particle size distribution".

The measurement by the OPTOMAX image analyser is performed by means of an inverted microscope which makes it possible to examine suspensions of particles at a magnification between 16 and 200 ×. A television camera picks up the images given by the inverted microscope and transmits them to a computer which analyses the images line by line and dot by dot on each line, in order to determine the dimensions or diameters of the particles and then to classify them.

The following non-restrictive Examples illustrate the invention.

EXAMPLE 1

(a) Production of the Catalyst

Preparation of the Support

Into a 5-liter stainless steel reactor, provided with a system of agitation rotating at 750 revolutions per minute and containing 800 ml of n-hexane, there are introduced at ambient temperature (20° C.) and under a blanket of nitrogen: 1725 ml of a solution of butyloctylmagnesium in heptane containing 1500 milligramme-atoms of magnesium and 61 ml (300 millimoles) of di-isoamyl ether (DIAE). The reactor is then heated to 50° C. and over 3 hours 313 ml of tertiary-butyl chloride (or 2850 millimoles) are poured in drop by drop. At the end of this addition, the suspension is maintained at 50° C. for 3 hours and the precipitate (A) obtained is then washed five times with n-hexane. The washed product (A) constitutes the support; its chemical composition is as follows per gramme-atom of magnesium:

1.97 gramme-atom of chlorine;
  0.03 gramme-equivalent of Mg-C bond;
  0.02 mole of di-isoamyl ether.

On examination under the microscope it was possible to see that the magnesium chlorine support occurs in the form of a powder consisting of spheroidal particles (the mean ratio between large and small axes, D/d of the particles is equal to 1.2), having a narrow particle size distribution defined by the ratio Dm/Dn=1.2, where Dm =33 microns; in addition it is found that more than 90 percent by weight of the particles have a mean diameter comprised between 30 and 36 microns. The density of the product is equal to 1.9 and its specific surface area to 38 $m^2/g$; the surface of the particles is smooth.

Preparation of the Catalyst

Into 3000 ml of suspension in n-hexane of the washed product (A) obtained above, containing 1450 millimoles of $MgCl_2$, there are added with agitation 82 ml of di-isoamyl ether and 400 ml of a 1.2 molar solution in n-hexane (or 480 millimoles) of diethyl aluminium chloride. The reactor is heated to 50° C. and over 2 hours 650 ml of a 0.6 molar solution of di-n-propoxy titanium dichloride (390 millimoles) in n-hexane are added drop by drop. At the end of this addition, the temperature is raised to 80° C. and it is maintained at this figure for 2 hours. The solid product is then washed five times with n-hexane to produce the catalyst (B) ready for use. Analysis of the catalyst shows that it contains per gramme atom of total titanium:

0.06 gramme-atom of tetravalent titanium;
  0.94 gramme-atom of trivalent titanium;
  3.85 gramme-atoms of magnesium;
  9.87 gramme-atoms of chlorine;
  0.20 gramme-atom of aluminium and
  0.11 gramme-molecule of di-isoamyl ether (DIAE).

It is brown-coloured powder consisting of particles of a more or less spherical shape, having a narrow particle size distribution in the image of the support employed and in particular such that more than 90 percent by weight of the particles have a mean diameter comprised between 32 and 38 microns, where Dm=35 microns; moreover, it is found that the ratio Dm:Dn of the catalyst particles is equal to 1.3; the surface of the particles is smooth.

(b) Production of the Prepolymer

Into a 5-liter stainless steel reactor, equipped with an agitation system rotating at 750 revolutions per minute, there are introduced under nitrogen 2 liters of n-heptane which are heated to 70° C. There are then introduced 48 ml of a solution of 1 mole per liter of tri-n-octylaluminium (TnOA) and a quantity of catalyst (B) prepared as above under (a), containing 12 milli-gramme-atoms of titanium.

There are then introduced into the reactor, hydrogen corresponding to a partial pressure equal to 0.08 MPa, then ethylene at a rate of 160 g/hr for 3 hours. At the end of the reaction, the whole is decanted into a rotary evaporator under a vacuum; in this way one obtains 480 g of a dry prepolymer powder (C), containing 0.025 milligramme-atom of titanium per gramme. This powder consists of spheroidal particles having a particle size distribution such that the ratio $Dm/Dn=1.3$, where $Dm=140$ microns; the surface of the particles is smooth.

(c) Copolymerisation in a Fluidised Bed

Into a fluidised bed reactor in stainless steel, with a diameter of 15 cm, operating with a rising gas mixture, actuated at a speed of 40 cm/sec, containing a molar percentage of 5% hydrogen, 8% 4-methyl-pentene-1, 22% ethylene and 65% nitrogen, under a total pressure of 1 MPa and a temperature maintained at 80° C., there are introduced first of all 3200 g of a polyethylene powder which is perfectly anhydrous and desiccated for the charge powder, then, sequentially, 2.2 g of prepolymer (C) prepared as above under (b) every 10 minutes.

By withdrawing from the reactor 640 g of powder per hour, the level of the fluidised bed remains constant. After 10 hours operation, the charge powder is practically completely replaced and one obtains a copolymer powder whose characteristics are as follows:

- More or less spherical particles, having a mean diameter by mass equal to 510 microns;
- Narrow particle size distribution, such that the ratio $Dm/Dn=1.7$;
- Bulk density of the powder: 0.40 g/cm$^3$;
- Density of the copolymer: 0.920;
- Melt index measured at 190° C. under a load of 2.16 kg (as per standard ASTM D 1238): 1 g/10 minutes;
- Content of units derived from 4-methyl-pentene-1: 9 percent by weight;
- Titanium content: 25 ppm
- Unsaturation level: 0.1 ethylenic double bond per 1000 carbon atoms;
- Single melting point at 124° C., determined by scanning differential calorimetirc analysis after re-heating to 200° C., cooling at a rate of 16° C. per minute and heating at a rate of 16° C. per minute;
- Long chain branching: $g^*=0.90$.

EXAMPLE 2

As support (A) there is employed a powder based on magnesium chloride consisting of spheroidal particles having a narrow particle size distribution, such that $Dm/Dn=2.3$, where $Dm=23$ microns; this powder contains less than 0.05 percent by weight of particles with a diameter less than 4 microns; it shows a density equal to 1.9 and a specific surface area equal to 46 m$^2$/g (BET); the surface of the particles is smooth.

(a) Production of the Catalyst

This is identical to that of Example 1(a). Analysis of the catalyst (B) obtained gives per gramme-atom of total titanium:

0.94 gramme-atom of trivalent titanium,
0.06 gramme-atom of tetravalent titanium,
3.80 gramme-atoms of magnesium,
9.85 gramme-atoms of chlorine,
0.16 gramme-atom of aluminium and
0.08 mole of di-isoamyl ether.

The catalyst (B) is a brown powder consisting of spheroidal particles having a particle size distribution such that $Dm/Dn=2.4$, where $Dm=23$ microns; the particles of catalyst have a surface as smooth as the initial support.

(b) Production of the Prepolymer

This is identical to that of Example 1(b), except for the fact that instead of introducing into the reactor ethylene at a rate of 160 g/hr, there is introduced a mixture of ethylene and 4-methyl-pentene-1 containing 3.5 percent by weight of 4-methyl-pentene-1, at a rate of 160 g per hour. One obtains 480 g of a prepolymer powder (C) having a density of 0.94 and containing 0.025 milligramme-atom of titanium per gramme. This powder consists of spheroidal particles having a particle size distribution such that the ratio $Dm/Dn=2.4$, where $Dm=100$ microns; the surface of the particles is smooth.

(c) Copolymerisation in a Fluidised Bed

This is identical to that of Example 1(c), except for the fact that instead of employing a gaseous mixture containing a molar percentage of 5% hydrogen, 8% 4-methyl-pentene-1, 22% ethylene and 65% nitrogen, there is employed a gaseous mixture containing 5% hydrogen, 7% 4-methyl-pentene-1, 23% ethylene and 65% nitrogen as a molar percentage. There are withdrawn from the reactor 680 g of powder per hour, whilst maintaining the fluidised bed at a constant height. After 10 hours of continuous reaction, there is obtained a copolymer powder whose characteristics are as follows:

- Particles of spheroidal shape having a mean diameter by mass equal to 370 microns.
- Particle size distribution such that the ratio $Dm/Dn=2.8$.
- Bulk density of the powder: 0.42 g/cm$^3$.
- Density of copolymer: 0.925.
- Melt index measured at 190° C. under a load of 2.16 kg: 0.9 g/10 minutes.
- Content of units derived from 4-methyl-pentene-1: 8 percent by weight.
- Titanium content: 23 ppm.
- Unsaturation level: 0.13 ethylenic double bond per 1000 carbon atoms.
- Single melting point at 120° C., determined by scanning differential calorimetric analysis, after reheating to 200° C., cooling at a rate of 16° C. per minute and heating at a rate of 16° C. per minute.
- Long chain branching: $g^*=0.97$.

EXAMPLE 3

As support (A) there is employed a powder based on magnesium chloride, consisting of spheroidal particles having a narrow particle size distribution, such that the ratio $Dm/Dn=1.1$, where $Dm=52$ microns; it is found that more than 90 percent by weight of the particles have a mean diameter comprised between 47 and 57 microns; the density of the product is equal to 1.9 and its specific surface area to 38 m$^2$/g (BET); the surface of the particles is smooth.

(a) Production of the Catalyst

This is identical to that of Example 1(a). Analysis of the catalyst (B) obtained gives per gramme-atom of total titanium:

0.95 gramme-atom of trivalent titanium,
0.05 gramme-atom of tetravalent titanium,
3.80 gramme-atoms of magnesium,
9.95 gramme-atoms of chlorine,
0.20 gramme-atom of aluminium and
0.11 mole of di-isoamyl ether.

The catalyst (B) is a brown powder consisting of spheroidal particles having a particle size distribution such that Dm/Dn=1.2, where Dm=55 microns; the catalyst particles have a smooth surface.

(b) Production of Prepolymer

Prepolymerisation (First Stage)

Into a 5-liter stainless steel reactor, equipped with an agitation system rotating at 750 revolutions per minute and containing 2 liters of n-hexane heated to 50° C., there are introduced under a blanket of nitrogen 100 millimoles of tri-n-octylaluminium (TnOA) and a suspension of the catalyst (B) in hexane containing 500 milligramme-atoms of titanium. The reactor is heated to 60° C. and the ethylene is introduced into it at a constant rate equal to 167 g/hr, over 3 hours. At the end of the reaction the whole is decanted into a rotary evaporator under a vacuum; in this way 820 g of dry powder (C') are obtained of a prepolymer of a light-brown colour, consisting of particles with a mean diameter by mass equal to 66 microns and with a narrow particle size distribution, such that the ratio Dm/Dn=1.2. The powder (C') is stored under nitrogen.

Prepolymerisation (Second Stage)

Into a fluidised bed reactor with a diameter of 15 cm operating at a gas speed of 10 cm/sec, under partial pressures of 0.8 MPa nitrogen, 0.1 MPa hydrogen, 0.02 MPa 4-methyl-pentene-1 and 0.08 MPa ethylene, there are introduced, every 6 minutes, 11 g of the powder (C') and continuously 25 g/hr of pure TnOA, into the lower half of the bed which is maintained at 70° C. In a series of withdrawals approximately 4 kg/hr are collected of a slightly beige-tinted powder which contains 0.017 milligramme-atom of titanium per gramme, for a residence time of half an hour in the reactor, and showing a particle size distribution such that the ratio Dm/Dn=1.3, where Dm=260 microns, and having a density of 0.93.

(c) Copolymerisation in a Fluidised Bed

This is identical to that of Example 1(c), except for the fact that instead of employing the gaseous mixture actuated at a speed of 40 cm/sec, it is employed at a speed of 60 cm/sec. 650 g of powder are withdrawn from the reactor per hour, whilst maintaining the fluidised bed at a constant height. After 10 hours of continuous reaction, a copolymer powder is obtained whose characteristics are as follows:

Particles of a spheroidal shape, having a mean diameter by mass equal to 950 microns.
Particle size distribution such that the ratio Dm/Dn=1.5.
Bulk density of the powder: 0.41 g/cm$^3$.
Density of copolymer: 0.919.
Melt index, measured at 190° C. under a load of 2.16 kg: 1 g/10 minutes.
Content of units derived from 4-methyl-pentene-1: 9 percent by weight.
Titanium content: 16 ppm.
Unsaturation level: 0.15 ethylenic double bond per 1000 carbon atoms.
Single melting point at 118° C., determined by scanning differential calorimetric analysis, after re-heating to 200° C., cooling at a rate of 16° C. per minute and heating at a rate of 16° C. per minute.
Long chain branching: g*=0.95.

Method for determining the long-chain branches ratio, g*.

In the equation $g^* = (\eta)/(\eta)_1$, the intrinsic viscosity ($\eta$) of the copolymer is measured in the trichlorobenzene at 135° C. On the other hand, the intrinsic viscosity $(\eta)_1$ of the linear polyethylene, having the same weight average molecular weight, Mw, as the said copolymer, is calculated according to the following equation of MARK-HOUWINK's type: $(\eta)_1 = 6.02 \times 10^{-4} \times (Mw)^{0.69}$; the weight average molecular weight, Mw, of the copolymer is determined by gel permeation chromatography (GPC), the fractionating columns being calibrated by means of linear polyethylene samples.

We claim:

1. A co-polymer of ethylene and 4-methyl-pentene-1, characterised in that it is the form of a powder consisting of non-sticky particles having a mean diameter by mass, Dm, comprised between 300 and 1500 microns, and a particle size distribution such that the ratio Dm:Dn is less than or equal to 3.5, and characterised in that it has:
   (a) a content of units derived from 4-methyl-pentene-1 comprised between 4 and 15% by weight,
   (b) a density comprised between 0.910 and 0.940,
   (c) a bulk density comprised between 0.35 and 0.45 g/cm$^3$,
   (d) an unsaturation level of less than 0.2 double bonds per 1000 carbon atoms,
   (e) a single melting point comprised between 116° and 128° C., determined by scanning differential calorimetric analysis after re-heating to 200° C., cooling at the rate of 16° C. per minute and heating at the rate of 16° C. per minute,
   (f) a structure with a small amount of long-chain branches such that g* is greater than or equal to 0.90 wherein g* is the ratio $\eta/\eta_1$, $\eta$ being the intrinsic viscosity of the copolymer and $\eta_1$ being the intrinsic viscosity of a liner polyethylene having the same weight average molecular weight as the said copolymer, and is obtained by a co-polymerisation process comprising providing a catalyst system comprising on the one hand a co-catalyst consisting of at least one organo-metallic compound of a metal of Groups II and III of the Periodic Table of Elements and on the other hand a catalyst comprising a support based essentially on magnesium chloride and optionally containing an aluminium chloride, consisting of particles of spheroidal shape having a mean diameter by mass comprised between 10 and 100 microns and showing a particle size distribution such that the ratio Dm/Dn of the mean diameter by mass, Dm, to the mean diameter by number, Dn, of the particles is less than or equal to 3, on to which support there has been precipitated a derivative of a transition metal of Groups IV, V and VI of the Periodic Table of Elements which is known for its catalytic properties in the polymerisation and co-polymerisation of alpha-olefins,
   wherein before the said co-polymerisation is carried out, subjecting the catalyst to a pre-polymerisation of the ethylene or a pre-co-polymerisation of the ethylene and 4-methyl-pentene-1 in suspension in an inert liquid medium so as to obtain a prepolymer having from 0.1 to 500 g. of polymer or co-polymer per milli-gramme-atom of transition metal, recovering said prepolymer as a dry powder, co-polymerising ethylene and said 4-methyl-pentene-1 in the gaseous state in admixture with said prepolymer powder, an inert gas such as nitrogen, methane or ethane and optionally with hydrogen, the gaseous mixture circulating from bottom to top through a fluidised bed of the co-polymer being formed, the co-polymerisation being effected at a temperature comprised between 50° and 90° C., in the presence of said catalyst, and the partial pressure (pp) of the various constituents of the gaseous mixture being such that: pp 4-methyl-pentene-1 is in the range 0.05 MPa to 0.15 MPa, pp 4-methyl-pentene-1/pp ethylene is in the range 0.15 to 0.5, pp hydrogen/pp ethylene is in the range 0.05 to 0.5, pp inert gas/total pressure is in the range 0.2 to 0.9.

2. A co-polymer as claimed in claim 1, characterised in that it occurs in the form of spheroidal particles.

3. A co-polymer as claimed in claim 1, characterised in that it has a particle size distribution such that the ratio Dm:Dn is comprised between 1.2 and 3.

4. A co-polymer of ethylene and 4-methyl-pentene-1 characterised in that it is in the form of a powder consisting of non-sticky particles having a mean diameter by mass, Dm, comprised between 300 and 1500 microns, and a particle size distribution such that the ratio Dm:Dn is less than or equal to 3.5, and characterised in that it has:

(a) a content of units derived from 4-methyl-pentene-1 comprised between 4 and 15% by weight, (b) a density comprised between 0.910 and 0.940, (c) a bulk density comprised between 0.35 and 0.45 g/cm$^3$, (d) an unsaturation level of less than 0.2 double bonds per 1000 carbon atoms, (e) a single melting point comprised between 116° C. and 128° C., determined by scanning differential calorimetric analysis after re-heating to 200° C., cooling at the rate of 16° C. per minute and heating at the rate of 16° C. per minute, (f) a structure with a small amount of long-chain branches such that g* is greater than or equal to 0.90 wherein g* is the ratio $\eta/\eta_1$, $\eta$ being the intrinsic viscosity of the co-polymer and $\eta_1$ being the intrinsic viscosity of a linear polyethylene having the same weight average molecular weight as the said co-polymer.

5. A copolymer of ethylene and a hexene-1 characterized in that it is in the form of a powder consisting of non-sticky particles having a mean diameter by mass, Dm, comprised between 300 and 1500 microns, and a particle size distribution such that the ratio Dm:Dn is less than or equal to 3.5, and characterized in that it has:

(a) a content of units derived from hexene-1 comprised between 4 and 15% by weight, (b) a density comprised between 0.910 and 0.940, (c) a bulk density comprised between 0.35 and 0.45 g/cm$^3$, (d) an unsaturation level of less than 0.2 double bonds per 1000 carbon atoms, (e) a single melting point comprised between 116° C. and 128° C., determined by scanning differential calorimetric analysis after reheating to 200° C., cooling at the rate of 16° C. per minute and heating at the rate of 16° C. per minute, (f) a structure with a small amount of long-chain branches such that g* is greater than or equal to 0.90 wherein g* is the ratio $\eta/\eta_1$, $\eta$ being the intrinsic viscosity of the co-polymer and $\eta_1$ being the intrinsic viscosity of a linear polyethylene having the same weight average molecular weight as the said co-polymer.

* * * * *